United States Patent [19]

Fuhs

[11] Patent Number: 4,704,604
[45] Date of Patent: Nov. 3, 1987

[54] PIVOTING MOUNT FOR DETACHABLE KEYBOARD

[75] Inventor: Eric D. Fuhs, Stevensville, Mich.

[73] Assignee: Zenith Electronics Corporation, Glenview, Ill.

[21] Appl. No.: 675,488

[22] Filed: Nov. 28, 1984

[51] Int. Cl.[4] .............................................. G09G 1/00
[52] U.S. Cl. ................................... 340/700; 340/711; 248/293; 248/1; 364/708
[58] Field of Search .................... 340/700, 711, 365 R; 400/682; 312/208, 282; 248/1 B, 1 H, 1 I, 293; 16/254, 260, 267; 364/708, 709; D14/114, 115

[56] References Cited

U.S. PATENT DOCUMENTS

| | | | |
|---|---|---|---|
| 3,130,651 | 4/1964 | Werner | 16/267 |
| 3,940,758 | 2/1976 | Margolin | 400/682 |
| 4,208,081 | 6/1980 | Kekas et al. | 400/682 |
| 4,294,496 | 10/1981 | Murez | 312/208 |
| 4,496,943 | 1/1985 | Greeblatt | 340/711 |
| 4,580,822 | 4/1986 | Fukumoto | 16/267 |

FOREIGN PATENT DOCUMENTS

| | | | |
|---|---|---|---|
| 3541067 | 1/1975 | Fed. Rep. of Germany | 16/267 |
| 2069197 | 8/1981 | United Kingdom | 340/365 S |

OTHER PUBLICATIONS

*IBM Technical Disclosure Bulletin*, "Keyboard Support Lifting Assembly with Locking Feature", vol. 28, No. 6, Nov. 1985.

Primary Examiner—Gerald L. Brigance
Assistant Examiner—Jeffery A. Brier

[57] ABSTRACT

A pivoting mount for a detachable, low profile keyboard in a computer terminal which includes a video display unit, e.g., a CRT, provides for the secure positioning of the keyboard adjacent to the video display unit in either a lowered, use position or a raised, stored position. In the use position, the keyboard is maintained in a stable horizontal orientation immediately below and forward of the faceplate of the video display unit. In the stored position, the keyboard is securely maintained in a generally vertical orientation immediately forward of the video display unit's faceplate so as to provide protection therefor and enhance the portability of the computer terminal. This mounting arrangement also provides for the remote use of the keyboard by facilitating its removal from the computer terminal to which it remains electrically coupled by means of a cable.

9 Claims, 3 Drawing Figures

PIVOTING MOUNT FOR DETACHABLE KEYBOARD

BACKGROUND OF THE INVENTION

This invention relates generally to desktop computer terminals and is particularly directed to an arrangement for mounting a detachable keyboard adjacent to a video display in a portable computer terminal.

Desktop computer terminals generally include a video display device suoh as a cathode ray tube (CRT) and a multi-key keyboard positioned within a single, compact chassis. Also located within the chassis may be a disc drive mechanism for the storage and recall of data and/or computer terminal operating instructions. The tendency today is toward denser packaging and reduced size, enhanced ruggedness for use in a wide variety of environments, and greater operator flexibility in using the computer terminal. These factors, as well as others, have given rise to the portable computer terminal.

The portable computer terminal is characterized as being rugged, compact and adaptable. In order to provide increased operator flexibility, the keyboard is frequently detachable from the computer terminal housing within which the CRT is located to provide a remote operating capability. Other portable computer terminal arrangements, while not providing a detachable keyboard, permit the keyboard to be displaced between a first, use position and a second, nonuse or stored position. For enhanced portability, the computer terminal in the stored configuration should provide protection for the various components thereof, should offer a rugged and compact configuration, and should prevent accidental or inadvertent actuation or operation of the keyboard control elements. To date, no single portable desktop computer configuration has been able to provide all of the aforementioned desirable attributes, as prior art arrangements have been characterized as being overly complex and thus expensive, unreliable and susceptible to damage, and unable to provide both a stable multi-position keyboard arrangement as well as a detachable keyboard capability.

The present invention is intended to overcome the aforementioned limitations of the prior art by providing a pivoting mount for a detachable, low profile keyboard particularly adapted for use in a portable, desktop video display-equipped computer terminal. The pivoting keyboard mount provides for the secure positioning of the keyboard adjacent to the video display in either a raised, stored position or a lowered, use position and permits the keyboard to be completely detached from the video display unit for remote operation of the computer terminal.

OBJECTS OF THE INVENTION

Accordingly, it is an object of the present invention to provide an improved mounting arrangement for a detachable keyboard in a portable computer terminal.

It is another object of the present invention to provide for the secure positioning of a low profile keyboard in either a lowered, use position or a raised, stored position in a portable computer terminal.

Yet another object of the present invention is to provide a keyboard mounting arrangement for a portable computer terminal having a video display which provides increased protection for the video display by securely positioning the keyboard over the video display faceplate when not in use.

A further object of the present invention is to provide an improved arrangement for mounting a removable, remotely operable keyboard in a portable computer terminal.

A still further object of the present invention is to provide an arrangement for coupling a detachable keyboard to portable computer terminal which is inexpensive, easily manipulated, highly reliable and durable, and which requires a minimum number of components.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
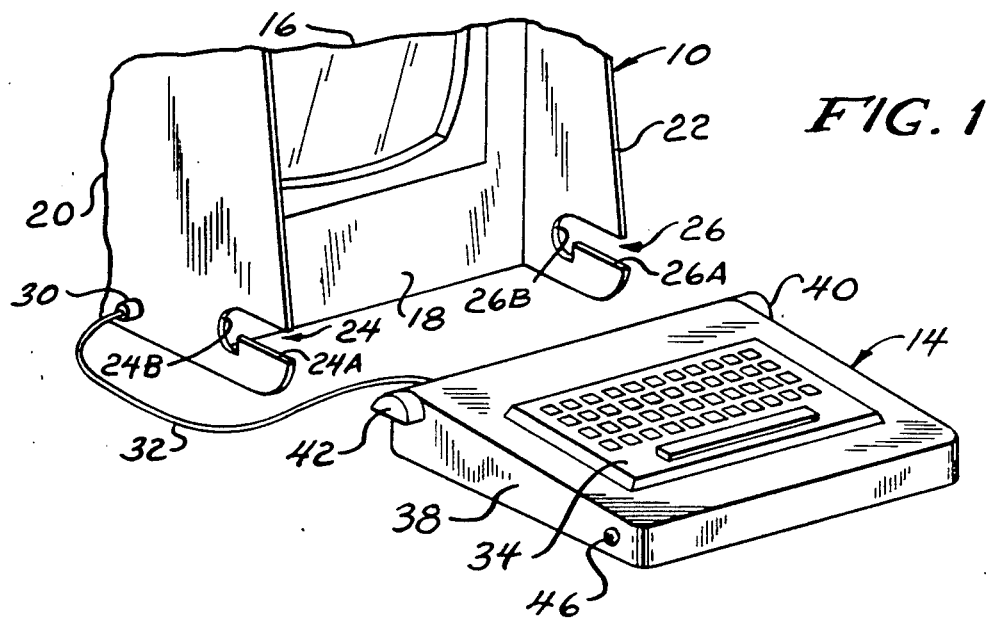
FIG. 1 is a perspective view of a computer terminal including a video display unit and a detachable keyboard wherein is shown a pivoting mount for the detachable keyboard in accordance with the present invention.

Referring to FIG. 1, there is shown a partial perspective view of a computer terminal 10 which includes a video display unit 16 and a detachable keyboard 14.

The video display unit 16 is typically a cathode ray tube (CRT), the faceplate of which is positioned adjacent to and contiguous with a front panel 18 of the computer terminal 10. Viewing the computer terminal 10 from the rear, the computer terminal 10 further includes right and left side panels 20, 22. The computer terminal 10 includes various other panels which are not shown in FIG. 1 for simplicity and which provide the computer terminal 10 with a generally enclosed structure within which are located the CRT 16 as well as various electronic systems and components (not shown) required for the operation of the computer terminal 10. Various electromechanical components, such as a disc drive (not shown), may also be located within the computer terminal 10 in an integrated computer terminal arrangement.

The right and left side panels 20, 22 extend forward of the front panel 18 of the computer terminal 10 and are respectively provided with right and left mounting slots 24, 26. The right and left mounting slots 24, 26 are positioned generally below the CRT 16 and within a lower, forward edge portion of a respective side panel. The right and left mounting slots 24, 26 are generally in parallel alignment and are each comprised of a respective elongated channel 24A, 26A which are aligned in a generally horizontal orientation within a respective side panel. Each of the mounting slots 24, 26 is open at a forward edge portion of a respective right and left side panel 20, 22. The inner end portion of each of the elongated channels 24A, 26A is defined by a respective detent end portion 24B, 26B. Each of the detent end portions 24B, 26B has a generally curvilinear shape in the form of a semi-circle and is continuous with the immediately adjacent elongated channel portion of a respective mounting slot.

The keyboard 14 is generally rectangular in shape and is electrically coupled to the computer terminal 10 by means of the combination of a connector 30 in the computer terminal 10 and a flexible electrical lead or cable 32. The keyboard 14 includes a selectable key array 34 on an upper surface thereof and is generally of the low profile type and is thus of limited thickness, or depth. The keyboard 14 is defined by a plurality of lateral panels including a right lateral panel (not shown in FIG. 1) and a left lateral panel 38. Securely positioned on a forward, upper portion of the right lateral panel is a right coupling insert 40. Similarly, securely positioned upon a forward, upper portion of the left lateral panel 38 is a left coupling insert 42. Each of the right and left coupling inserts, or details, 40, 42 is generally semi-circular in cross-section, with the flat, lower portion thereof aligned generally along the longitudinal axis of the keyboard 14.

Each of the right and left mounting slots 24, 26 is adapted to receive a respective coupling insert 42, 40 in sliding engagement with the keyboard 14 aligned generally horizontally. The keyboard 14 may thus be either attached to the right and left side panels 20, 22 of the computer terminal 10 or may be slidably removed therefrom and operated in a remote control mode wherein the keyboard 14 is completely detached from the computer terminal 10. This is shown in FIG. 1, where the keyboard 14 and the computer terminal 10 are coupled by the aforementioned flexible electrical cable 32.

With each coupling insert 40, 42 positioned in a respective forward end portion of the elongated channels 26A, 24A of the left and right mounting slots 26, 24, the keyboard 14 is not free to pivot downward and is maintained in a generally horizontal orientation by means of the abutting engagement between the coupling inserts and the mounting slots. From FIG. 2, it can be seen that the generally flat portion of each of the right and left coupling inserts 40, 42 is engaged by a lower surface of a respective elongated channel 26A, 24A so as to prevent the counter-clockwise rotation of the keyboard 14 as viewed in FIG. 2. Thus, while the keyboard 14 may be slidably removed from the side panels of the computer terminal 10 when in the orientation and position shown in FIG. 2, the mounting slots 24, 26 within each of the side panels prevent the downward rotation of the keyboard 14 which is thereby maintained in a stable, generally horizontal orientation.

Figure 2:
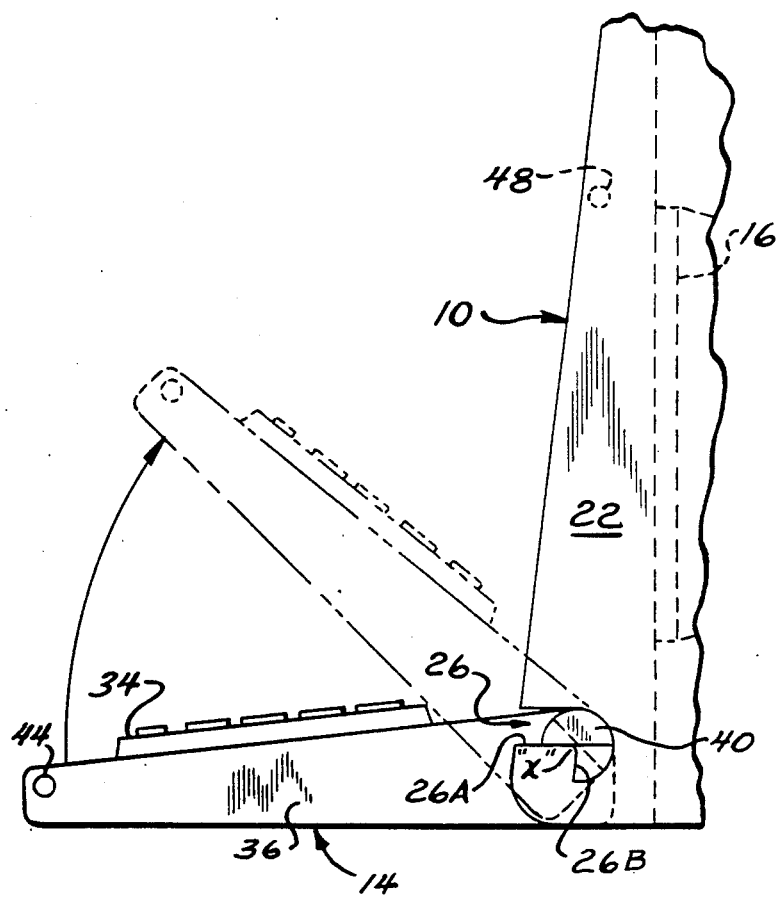
FIG. 2 is a side view of a portion of the computer terminal of FIG. 1 showing the details of the detachable keyboard pivoting mount of the present invention wherein the keyboard is securely positioned in the lowered, use position on a forwardc portion of the computer terminal adjacent to the terminal's video display unit.

While the keyboard 14 is not free to rotate downward with each of its coupling inserts 40, 42 positioned in a forward end portion of a respective mounting slot 26, 24, the keyboard 14 may be rotated in an upward, clockwise direction as shown in dotted line form in FIG. 2 when thus coupled to the computer terminal 10. With the keyboard 14 rotated clockwise as shown in FIG. 2, the respective curvilinear portions of the coupling inserts 40, 42 and detent end portions 26B, 24B are positioned in a mutually engaging arrangement which permits rotational displacement therebetween. The complementary configurations of the coupling inserts and detent end portions of each mounting slot permits the keyboard 14 to be displaced upward and rotated clockwise about an axis designated by the letter "X" in FIG. 2.

Figure 3:
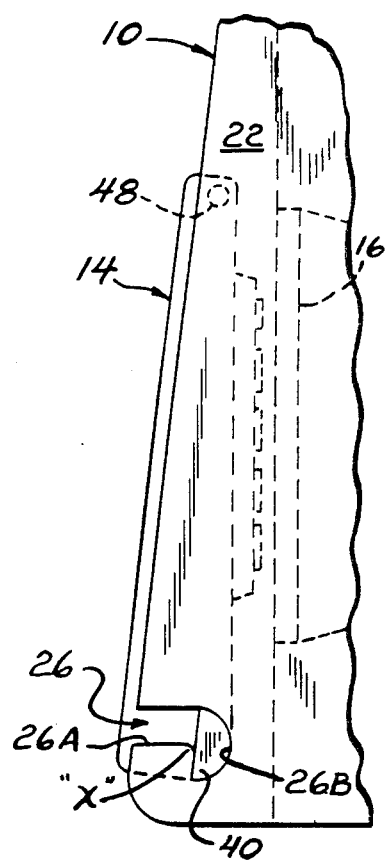
FIG. 3 is a side view of a pivoting mount for a detachable keyboard in a portable computer terminal in accordance with the present invention wherein the keyboard is positioned in the raised, stored configuration.

From FIG. 2, it can be seen that the keyboard 14 may be rotated clockwise until the linear portions of each of the right and left coupling inserts 40, 42 engage a corresponding linear portion of the detent end portion 26B, 24B of the left and right, mounting slots 26, 24. With the respective linear portions of the coupling inserts 40, 42 engaging a corresponding linear portion of a respective detent end portion 26B, 24B as shown in FIG. 3, the keyboard 14 is oriented generally vertically and is positioned immediately forward of the faceplate of the CRT 16 on a front portion of the computer terminal 10. From FIGS. 2 and 3, it can be seen that the linear portions of each of the detent end portions 24B, 26B are oriented beyond vertical and are generally inclined toward the CRT. This ensures that the keyboard 14 is maintained in a stable, generally upright, orientation in the stored, nonuse position wherein the keyboard 14 is inclined slightly toward the CRT 16.

The right and left lateral panels 36, 38 of the keyboard 14 are respectively provided with a locking pin 44, 46 on an aft portion thereof. Each of the locking pins 44, 46 is adapted for engagement with detents within each of the right and left side panels 20, 22 of the computer terminal 10. The left detent 48 positioned within the left side panel 22 is shown in dotted line form in FIGS. 2 and 3 and is adapted for receiving the right locking pin 44, which in a preferred embodiment is of the spring-loaded type, for maintaining the keyboard 14 in a generally upright orientation as shown for the retracted, stored position in FIG. 3. The right computer terminal side panel 20 is provided with a similar detent (not shown) for receiving and engaging the left locking pin 46 positioned on the left lateral panel 38 of the keyboard 14. The keyboard 14 may be displaced from the stored, nonuse position of FIG. 3 to the extended, use position of FIG. 2 by displacing it about the "X" axis shown therein and allowing it to rotate in a counterclockwise direction until the flat portions of each of the coupling inserts 40, 42 engages the lower surface of a respective elongated channel 26A, 24A of the left and right mounting slots 26, 24.

There has thus been shown a pivoting mount arrangement for a detachable, low profile keyboard in a portable computer terminal which permits the keyboard to be oriented in a stable, generally horizontal, use position and in a generally vertical, stored position. In addition, the keyboard may be slidably detached from the computer terminal by means of the same pivoting mount arrangement. In the stored position, the keyboard is positioned immediately forward of the faceplate of a video display unit within the computer terminal and provides protection therefor, while in the extended position easy access to all of the keys thereon is provided to a user.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a portable computer terminal including a video display, first and second lateral panels, and a detachable keyboard, means for mounting the keyboard in an extended, use position and in a retracted, stored position comprising:

first and second coupling inserts each positioned on a respective lateral portion of the keyboard and each including respective convex and linear portions;

first and second mounting slots positioned in a lower, forward edge portion of the first and the second lateral panels, respectively, and adapted for receiving a respective coupling insert in sliding engagement wherein with the linear portions of said first and second coupling inserts oriented parallel to and positioned in abutting contact with a lower edge of a respective mounting slot the keyboard may be stably positioned in the extended, use positions or may be detached from the computer terminal by sliding removal of said coupling inserts from said mounting slots; and first and second detents each including a concave portion complementary to and adapted to receive in close fitting relation the convex portion of an associated coupling insert, wherein each of said detents is located on an inner end portion of said first and said second mounting slots, respectively, for engaging a respective coupling insert in maintaining the keyboard in the retracted, stored position and for permitting the pivoting displacement of the keyboard between the extended, use position and the retracted, stored position.

2. Means for mounting a detachable keyboard as in claim 1 wherein the video display comprises a cathode ray tube having a generally vertically oriented faceplate positioned immediately above the keyboard when in the extended, use position and immediately aft of the keyboard when in the retracted, stored position.

3. Means for mounting a detachable keyboard as in claim 1 wherein each of said complementary curvilinear portions is generally semi-circular.

4. Means for mounting a detachable keyboard as in claim 3 wherein the respective complementary curvilinear portions and the linear portions of engaged coupling inserts and detents are in abutting contact with the keyboard in the retracted, stored position.

5. Means for mounting a detachable keyboard as in claim 1 wherein the keyboard is oriented generally horizontally in the extended, use position and generally vertically in the retracted, stored position.

6. Means for mounting a detachable keyboard as in claim 5 wherein the keyboard is positioned immediately below and forward of the video display in the extended, use position and immediately in front of the video display in the retracted, stored position so as to cover a faceplate of the video display.

7. Means for mounting a detachable keyboard as in claim 1 wherein the keyboard and the computer terminal are coupled by an elongated, flexible electrical cable.

8. Means for mounting a detachable keyboard as in claim 1 wherein each lateral panel of the computer terminal includes a coupling insert and each lateral portion of the keyboard includes a locking pin adapted for insertion in and engagement with a respective coupling insert when the keyboard is in the retracted, stored position.

9. Means for mounting a detachable keyboard as in claim 10 wherein each lateral portion of the keyboard includes a forward end and an aft end and wherein each coupling insert is positioned toward the forward end of a respective lateral portion and each locking pin is positioned toward the aft end of a respective lateral portion of the keyboard.

* * * * *